(12) United States Patent
Dally

(10) Patent No.: US 11,802,591 B2
(45) Date of Patent: Oct. 31, 2023

(54) JOURNAL-COUPLER FOR JOINING PANEL TORQUE TUBES

(71) Applicant: SUN AND STEEL SOLAR LLC, Stateline, NV (US)

(72) Inventor: Robert B. Dally, Stateline, NV (US)

(73) Assignee: SUN AND STEEL SOLAR LLC, Stateline, NV (US)

(*) Notice: Subject to any disclaimer, the term of this patent is extended or adjusted under 35 U.S.C. 154(b) by 956 days.

(21) Appl. No.: 16/363,303

(22) Filed: Mar. 25, 2019

(65) Prior Publication Data

US 2019/0292824 A1  Sep. 26, 2019

Related U.S. Application Data

(60) Provisional application No. 62/648,336, filed on Mar. 26, 2018.

(51) Int. Cl.
*F16D 1/02* (2006.01)
*H02S 20/32* (2014.01)

(52) U.S. Cl.
CPC ............ *F16D 1/02* (2013.01); *H02S 20/32* (2014.12); *Y10T 403/5733* (2015.01)

(58) Field of Classification Search
CPC . F16B 7/0406; F16D 1/02; F16D 1/10; F16D 1/101; F16D 2001/102; H02S 20/32; Y10T 403/3933; Y10T 403/3973; Y10T 403/57; Y10T 403/5733; Y10T 403/7098; F16C 3/02; F16C 3/023
USPC ................................................ 464/182, 183
See application file for complete search history.

(56) References Cited

U.S. PATENT DOCUMENTS

| | | | |
|---|---|---|---|
| 2,380,952 A * | 8/1945 | Dewey | F16C 3/02 464/182 |
| 2,425,033 A | 8/1947 | Fletcher | |
| 3,048,177 A | 8/1962 | Takaro | |
| 3,227,406 A | 1/1966 | Shelton et al. | |
| 3,554,306 A * | 1/1971 | Wilburn | F16D 1/101 175/320 |
| 4,085,816 A | 4/1978 | Amagai et al. | |
| 5,320,579 A * | 6/1994 | Hoffmann | F16C 3/026 464/182 |
| 5,540,465 A | 7/1996 | Sisk et al. | |
| 6,142,428 A | 11/2000 | Kamata et al. | |
| 6,234,541 B1 | 5/2001 | Wagner et al. | |

(Continued)

FOREIGN PATENT DOCUMENTS

| | | |
|---|---|---|
| CA | 2813917 A1 | 5/2012 |
| CN | 103727313 A | 4/2014 |

(Continued)

OTHER PUBLICATIONS

U.S. Non-Final Office Action for U.S. Appl. No. 16/363,288 dated May 13, 2021.

(Continued)

*Primary Examiner* — Josh Skroupa
(74) *Attorney, Agent, or Firm* — Sherman IP LLP; Kenneth L. Sherman; Steven Laut

(57) ABSTRACT

A system includes a coupler-journal including a central body portion and a coupling portion. The coupler-journal is configured for attaching with a first torque tube and a second torque tube. A bearing is configured for placement around the central body portion.

12 Claims, 5 Drawing Sheets

(56) References Cited

U.S. PATENT DOCUMENTS

| | | | |
|---|---|---|---|
| 6,305,719 B1 | 10/2001 | Smith, Jr. et al. | |
| 6,370,756 B1 * | 4/2002 | Conger | F16C 3/023 |
| | | | 464/180 |
| 6,484,384 B1 * | 11/2002 | Gibson | F16D 1/072 |
| | | | 29/523 |
| 6,520,710 B2 | 2/2003 | Wells | |
| 6,775,890 B2 | 8/2004 | Kolarik | |
| 7,350,834 B2 | 4/2008 | Ryhman et al. | |
| 7,780,065 B2 | 8/2010 | Vermaat | |
| 7,958,886 B2 | 6/2011 | Barsun et al. | |
| 8,192,210 B2 | 6/2012 | Gardner et al. | |
| 8,230,883 B2 | 7/2012 | Takeshita et al. | |
| 8,317,526 B2 | 11/2012 | Gardner et al. | |
| 8,449,308 B2 | 5/2013 | Smith et al. | |
| 8,864,182 B2 | 10/2014 | Buchanan | |
| 8,864,504 B1 | 10/2014 | Gretz | |
| 9,038,968 B2 | 5/2015 | Hennon | |
| 9,109,408 B2 * | 8/2015 | Wang | E21B 17/04 |
| 9,303,684 B2 | 4/2016 | Clavijo Lumbreras et al. | |
| 9,567,811 B2 * | 2/2017 | Kenno | F16D 1/104 |
| 9,806,669 B2 | 10/2017 | Michotte De Welle | |
| 9,808,893 B2 | 11/2017 | Mcclure | |
| 9,845,824 B2 | 12/2017 | Lamb et al. | |
| 10,008,975 B2 | 6/2018 | Au | |
| 10,097,134 B2 | 10/2018 | Molina et al. | |
| 10,320,326 B2 | 6/2019 | Schimelpfenig et al. | |
| 10,557,588 B2 | 2/2020 | Chiproot | |
| 10,615,739 B2 | 4/2020 | West et al. | |
| 10,845,092 B2 | 11/2020 | Dally | |
| 10,859,122 B2 * | 12/2020 | Paros | F16D 1/101 |
| 2003/0106968 A1 | 6/2003 | Terrill et al. | |
| 2013/0048798 A1 | 2/2013 | Bock et al. | |
| 2013/0118627 A1 | 5/2013 | Utay | |
| 2014/0346291 A1 | 11/2014 | Booth | |
| 2017/0108145 A1 | 4/2017 | Alquier et al. | |
| 2017/0317641 A1 * | 11/2017 | Rainer | F16D 1/101 |
| 2018/0062563 A1 * | 3/2018 | Bapat | H02S 20/32 |
| 2019/0068112 A1 | 2/2019 | Gnanapa et al. | |
| 2019/0158017 A1 * | 5/2019 | Hu | H02S 20/32 |
| 2019/0292823 A1 | 9/2019 | Dally | |
| 2020/0010037 A1 | 1/2020 | Davenport et al. | |
| 2020/0248930 A1 | 8/2020 | Kimble | |
| 2022/0098909 A1 | 3/2022 | Dally | |
| 2022/0200520 A1 | 6/2022 | Dally | |

FOREIGN PATENT DOCUMENTS

| | | |
|---|---|---|
| DE | 3827662 A1 | 2/1990 |
| EP | 2730830 A1 | 5/2014 |
| EP | 3537019 A1 | 9/2019 |
| EP | 3406952 B1 | 11/2019 |
| KR | 20110048497 A | 5/2011 |

OTHER PUBLICATIONS

U.S. Non-Final Office Action for U.S. Appl. No. 16/363,288 dated Jun. 12, 2020.
U.S. Advisory Action for U.S. Appl. No. 16/363,288 dated Nov. 20, 2020.
U.S. Final Office Action for U.S. Appl. No. 16/363,288 dated Sep. 17, 2020.
U.S. Non-Final Office Action for U.S. Appl. No. 17/549,567 dated Apr. 5, 2023.
U.S. Non-Final Office Action for U.S. Appl. No. 17/549,567 dated Aug. 30, 2023.

* cited by examiner

JOURNAL-COUPLER FOR JOINING PANEL TORQUE TUBES

CROSS-REFERENCE TO RELATED APPLICATIONS

This application claims the priority benefit of U.S. Provisional Patent Application Ser. No. 62/648,336, filed on Mar. 26, 2018, which is incorporated herein by reference in its entirety.

TECHNICAL FIELD

One or more embodiments relate generally to devices for rotational panels, and in particular, bearing and coupler-journal devices for joining torque tubes.

BACKGROUND

Single axis trackers are mounting structures used for the controlled movement of photovoltaic solar panels and other solar collecting means from east to west to track the sun daily.

SUMMARY

Some embodiments provide a system that includes a coupler-journal including a central body portion and a coupling portion. The coupler-journal is configured for attaching with a first torque tube and a second torque tube. A bearing is configured for placement around the central body portion.

These and other features, aspects and advantages of the one or more embodiments will become understood with reference to the following description, appended claims, and accompanying figures.

DETAILED DESCRIPTION

Figure 1:
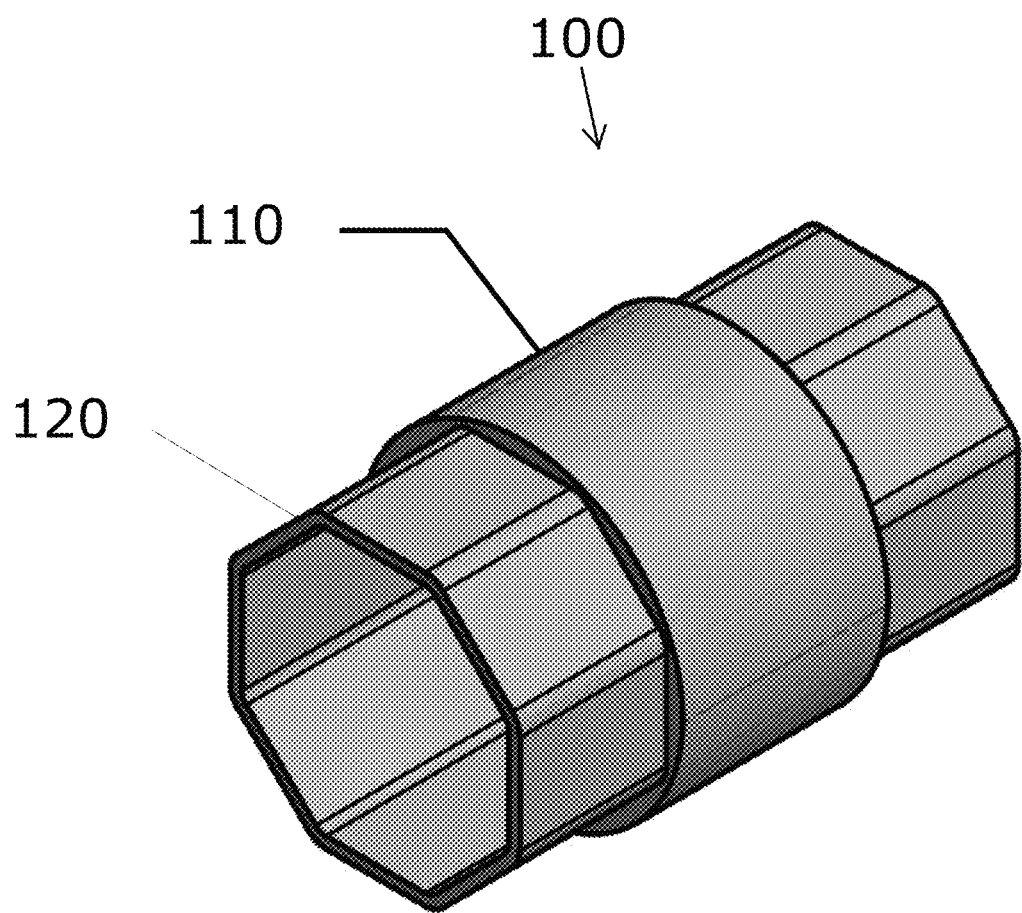
FIG. 1 shows a perspective view of a coupler-journal, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to devices for rotational panels, and in particular bearing and coupler-journal devices for joining torque tubes. One embodiment provides a system including a coupler-journal including a central body portion and a coupling portion. The coupler-journal is configured for attaching with a first torque tube and a second torque tube. A bearing is configured for placement around the central body portion.

It should be noted that most conventional single axis trackers utilize a coupling mechanism to connect many load-carrying axle segments or torque tubes end-to-end to form an axle on which solar panels are mounted and rotated to track the sun in a single axis direction. All single axis trackers must have each of their electrically conductive parts electrically grounded to earth ground. The torque tube system is the main grounding trunk for collecting the ground from the metal frames of the attached solar panels, the solar panel mounting hardware, and the mounting posts or piers. Plastic bushings typically used within the bearing system electrically isolate the posts or piers from the torque tubes, necessitating a flexible grounding strap from each and every non-moving post or pier to the grounded, rotating torque tube system.

Conventional systems use conventional bearings, couplers, and grounding straps independently, constituting three distinct parts. Most conventional trackers utilize a torque tube coupling system for connecting torque tubes end-to-end that is separate and independent from the bearing, and located a distance away. This constitutes two distinct parts of the coupler and the bearing to perform two distinct functions. Some conventional systems use a shaft journal with a flange at each of the two ends of the shaft, each flange having a bolt hole pattern to connect a torque tube on either end, which also have similar flanges. This design adjoins two adjacent torque tubes to complete the torque tube axle system. This design, while utilizing a single part to perform the two functions of a simple bearing journal and a torque tube coupler, requires the addition of mating flanges onto the ends of the torque tubes.

Most conventional systems include a plastic sleeve as a bushing between the journal and the bearing to prevent metal-to-metal rubbing and thus increase the number of parts. The plastic bushing is electrically non-conductive and electrically isolates the metallic journal from the metallic bearing for preventing a ground path from each post to the torque tube and thus, requiring a separate, field applied, flexible ground wire between the post and the rotating, grounded torque tube (increasing the parts count). This ground strap must flex and survive approximately 22,000 flexes from the daily east to west rotation over a typical thirty year life span of a solar utility plant. This added ground wire at each and every post requires terminal studs to be attached, usually by field welding, to the posts and to the torque tubes at each post location, to function as terminals onto which the ground wires are to be attached. Note that the fabrication of the ground wire, the field welding attachment of the two studs at each and every post location, the cleaning of the weld-induced burned galvanization followed up with an application of zinc rich paint, followed by torque wrench tightening of the two ring terminals of the ground wire to the two studs incorporates much labor and much human and field condition variability that brings into question consistency, quality, durability, and reliability of those ground paths.

Most single axis trackers use a non-circular torque tube to hold the solar panels. The facets on those torque tubes allow a stronger grasp of the solar panels to the torque tubes, but have reduced torsional strengths than round torque tubes, and can be more expensive to fabricate than standard round tubes. The difficulty with round tubes is how to grasp on and hold that position without slipping if the wind were to reach a maximum design level. The usual fix is to add holding material to the round torque tubes, either in the form of discrete tabs, or raised tracks that run the full length of each torque tube, and to mount the solar panel rails onto these tabs. In the case of the discrete tabs, future replacement of solar panels requires that the same size of solar module be utilized, whereas a raised track offers the most flexibility to change solar panel sizes but comes with the cost of a lot of excess material only needed sporadically.

Plastic bushings or plastic wear surfaces placed in between the turning journal and the stationary bearing are assumed to be required because of various fears about a metal-on-metal bearing. Some of these fears are that: there will be too much friction requiring too much turning torque; the system will squeak or make noise when turning; the metal interface will rust once the galvanization is worn away; and the rubbing metal components will wear thin and eventually fail mechanically. Note that square torque tubes, used as couplers, have been used as the journal within a round and simple bearing. The two relatively small surface areas of the two bottom corners of the square torque tube suffer from excessive wear caused by their excessive surface pressure during rotation. The primary reason for plastic bushings is to distribute the weight, and hence pressure, away from the small area of the two corners of a square torque tube to the much broader area of the round surface area typical in a round bearing system. One disadvantage of the plastic bushing is that they can break, especially if deployed improperly. Plastic can make a strong and durable wear surface but does not work well as a structural element used as a moving part that must withstand cyclic stress, such as would be the case of a rotating plastic bushing in a simple bearing system on a single axis tracker that must withstand an approximate 22,000 cycles of cyclic stress resulting from the shifting weight of the tracking solar panels, from various wind events, and from decades of thermal expansion and contraction of the long torque tube axle.

Many of the conventional single axis tracker systems have bushings and journals that must be placed onto the torque tube prior to field assembly. For example, a fully round journal, a fully round bushing, and a fully round bearing can only be installed from the ends of the torque tube and therefore must be slid onto the torque tubes before the torque tubes are coupled together. Sometimes, if the workers are not 100% careful, a bushing or journal can be inadvertently turned by one facet of the torque tube and the error is not discovered until the system is ready for commissioning, at which point the entire assembly around that error must be disassembled in order to correct the problem, which involves sliding the components off the end of the torque tube, rotating the component in correct alignment, and then sliding the components back on to the torque tube.

Some conventional single axis trackers utilize a one piece bearing component, and some single axis trackers utilize two bearing components, a bottom and a top, that are bolted together and by which the bolt provides all the holding strength to keep the top bearing component affixed to the bottom bearing component when a force is placed on the top bearing component (as a result of angular rotation of the solar panels or an upward wind force placed onto the solar panels, both of which place a force on the torque tube and journal that turns inside the bearing).

Some embodiments provide steel-on-steel friction that is relatively low, especially after the rubbing surfaces become shiny smooth over time. Movement is silent because the rotation is slow, is limited to approximately 90 degrees of rotation throughout the daylight hours, and is infrequent as it turns and stops in small increments. The metal interface is effectively wiped twice a day, keeping both surfaces of the bearing and journal rust free, shiny, smooth, and electrically conductive. In some embodiments, the large surface area of the cylindrical journal against the large cylindrical bearing surface minimizes the interface pressure and minimizes the wear. The wall thicknesses of the journal and the bearing are both sufficiently thick to survive and function structurally for the life of the system.

FIG. 1 shows a perspective view of a coupler-journal 100, according to some embodiments. As shown, the coupler-journal 100 includes a cylindrical central body 110 with additional thickness in the center that has a fully round outer surface which functions as the journal of the coupler-journal 100. A coupling portion 120 of the coupler-journal 100 is multi-faceted (e.g., octagonal) in shape to accept the insertion of smaller diameter similar shaped (e.g., octagonal shaped) torque tubes. The coupling portion 120 can be multi-faceted as shown here or it can be fully round to accept round (or oval) torque tubes.

Some embodiments provide the following: a field welded coupler for the torque tubes (e.g., torque tubes 300 (FIGS. 3A, 4A and 5A), torque tubes 310 (FIGS. 3B, 4B and 5B)) of a single axis solar tracker system that also performs the function of a round journal in a simple bearing for the turning torque tubes; a field welded journal for a single axis tracker that provides a thick, round gliding interface that maximizes the surface area to the simple bearing; a method of electrically grounding the simple bearing, and hence the post or pier (e.g., pier 220, FIG. 2) on which it is firmly attached, to the journal and hence to the torque tube that is clamped together with the coupler-journal, accomplished principally by the relatively large metal-to-metal contact surface areas of coupling portion 120 and the cylindrical central body 110 and the round bearing; a field welded journal that can be used on a single torque tube to function solely as a journal in a simple bearing to support that torque tube; a field welded journal that can be used on a single torque tube to function solely as a ground path for that torque tube; and an integral grounding path and method without having to add any additional hardware such as a ground strap or a ground wire and attachment means for a ground strap or ground wire.

In some embodiments, the coupler-journal 100 provides a metal-on-metal simple bearing that: has a relatively low coefficient of friction between steel and steel; does not squeak because the rotation is very slow and infrequent; will not rust at the simple bearing interfaces because the interface is wiped clean daily during movement and will therefore maintain shiny and rust-free surfaces; the system will not wear out and fail within the approximate thirty-year life for three reasons: the surface contact area is sufficiently large to significantly reduce the contact pressure and therefore significantly reduce the rate of wear; the turning action happens only about 22,000 times over the course of a thirty-year operational life; and the thicknesses of the coupler-journal 100 and of the formed simple bearing (see, e.g., FIG. 2) are sufficient enough to have the required structural strength over the intended life of the system.

For one or more embodiments, material costs can be and are reduced by having fewer parts, which can be achieved by having one part to perform multiple functions, such as having a coupler-journal 100 that performs as a coupler to hold together two adjacent torque tubes (e.g., torque tubes 300 (FIGS. 3A, 4A and 5A), torque tubes 310 (FIGS. 3B, 4B and 5B)) end-to-end and that also performs as a journal in a simple bearing system (see, e.g., FIG. 2) to allow the torque tubes to rotate. Material costs can also be reduced by removing the need for a separate ground strap at each pier 220 (FIG. 2) via the effective electrical ground commutation process of the simple bearing system. In some embodiments, installation costs can be and are reduced by having fewer parts to install, such as combining a coupler and a journal into one part. Further reductions in installation labor can be realized by not having to field apply a ground strap at each pier 220 of which must electrically connect the stationary post to the rotating torque tube. Operation and maintenance (O&M) costs can be and are reduced by having fewer parts to inspect, maintain, repair, or replace. This cost is further reduced by having a bolt together system that can be unbolted for easy adjustment or replacement in the field.

Figure 2:
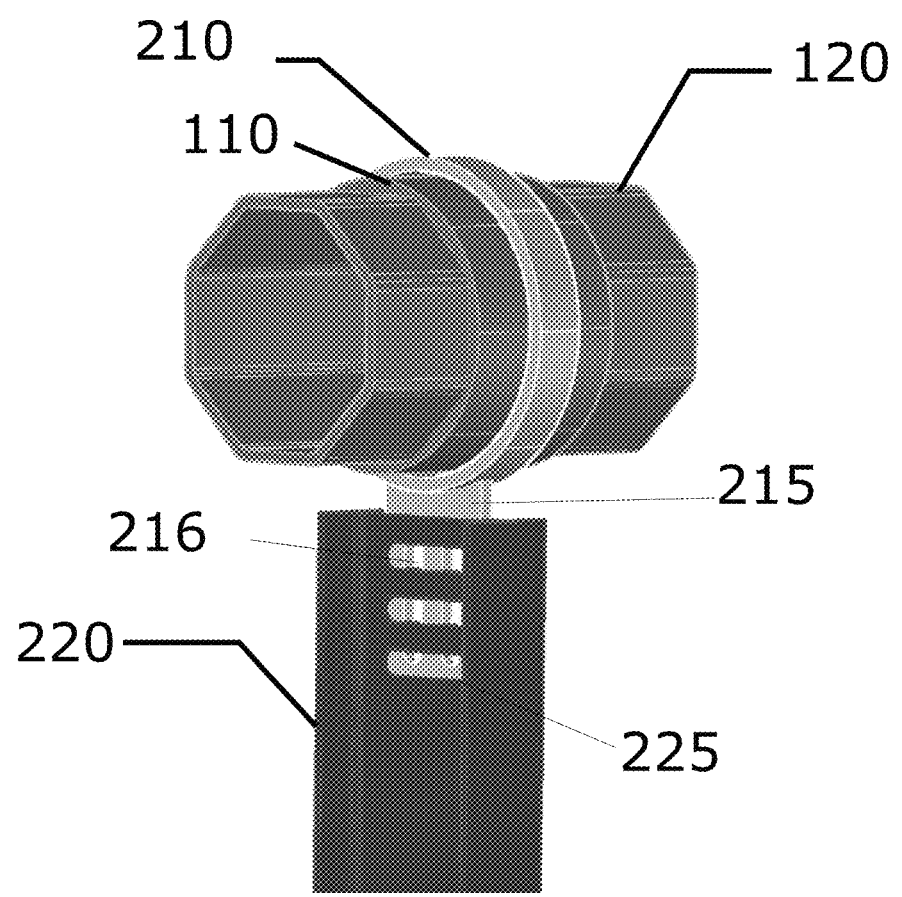
FIG. 2 shows a front perspective view of the coupler-journal of FIG. 1 placed within a bearing, according to some embodiments.

FIG. 2 shows a front perspective view of the coupler-journal 100 of FIG. 1 placed within a bearing 210, according to some embodiments. As shown, the coupler-journal 100 is placed into a round bearing 210 such that the journal portion of the coupler-journal 100, which is the cylindrical central body 110 with additional thickness in the center, will turn inside the bearing 210 to form a simple bearing system. The round bearing 210 is in place to be attached to the pier 220 using the pier coupler 215 portion of the round bearing 210. The pier 220 includes openings 225 for fastening the pier 220 to the pier coupler 215 portion through openings 216 with fasteners (e.g., nuts, bolts and washers, etc.).

Figure 3A:
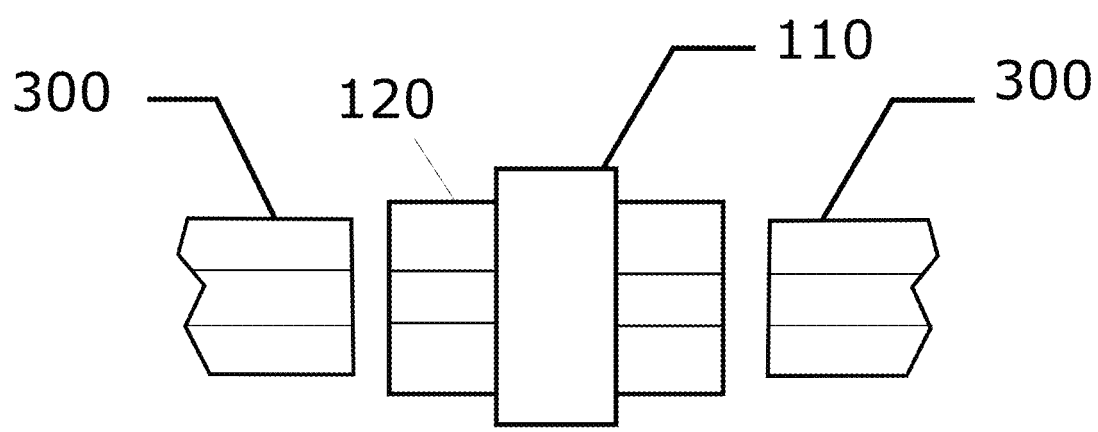
FIG. 3A shows a pair of torque tubes being placed within the coupler-journal of FIG. 1, according to some embodiments.

FIG. 3A shows a pair of torque tubes 300 being placed within the coupler-journal 100 of FIG. 1, according to some embodiments. In some embodiments, the torque tubes 300 are multi-faceted (e.g., octagonal shaped) and are in position to be inserted into a multi-faceted coupler-journal 100.

Figure 3B:
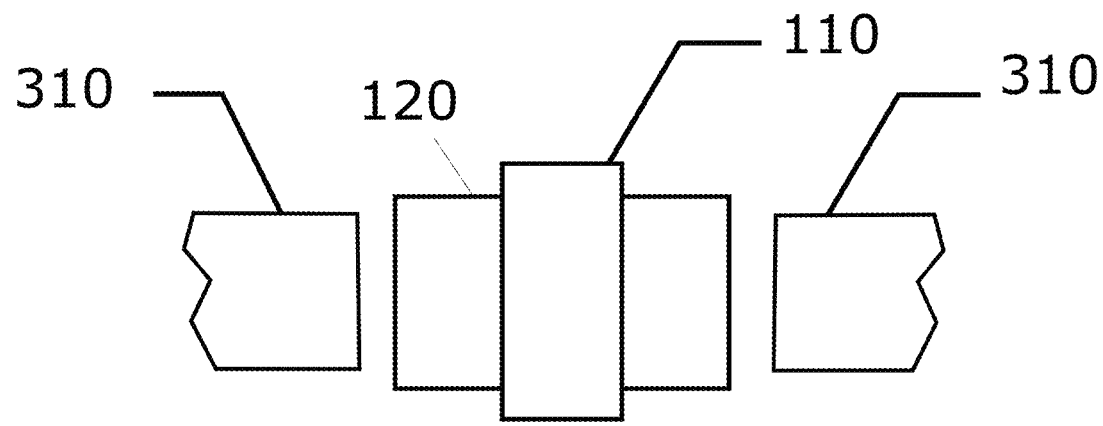
FIG. 3B shows another pair of torque tubes being placed within a coupler-journal, according to some embodiments.

FIG. 3B shows another pair of torque tubes 310 being placed within the coupler-journal 100, according to some embodiments. In one or more embodiments, the torque tubes 310 are cylindrical shaped (e.g., rounded with a weld bead lathed or sanded off) and are in position to be inserted into a cylindrical or round shaped coupler-journal 100.

Figure 4A:
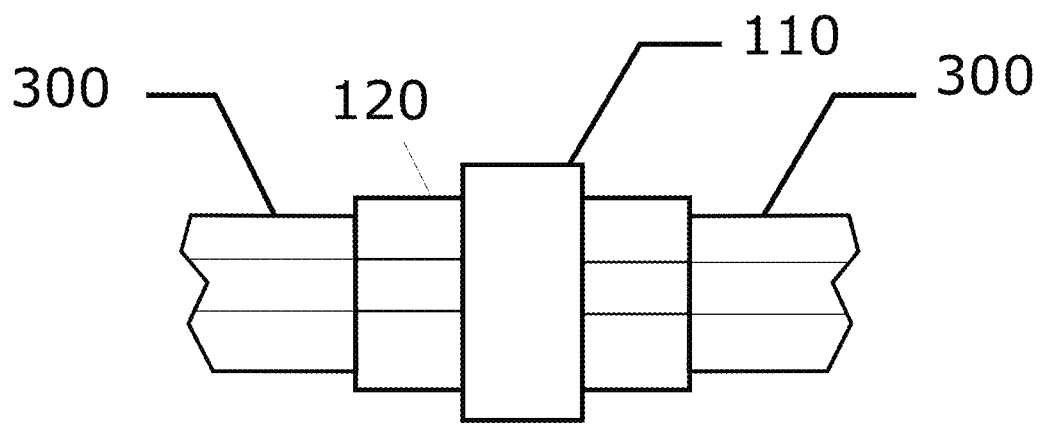
FIG. 4A shows the pair of torque tubes in FIG. 3A placed within the coupler-journal of FIG. 1, according to some embodiments.

FIG. 4A shows the pair of torque tubes 300 in FIG. 3A placed within the coupler-journal 100 of FIG. 1, according to some embodiments. As shown, two torque tubes 300 are each fully inserted into a respective opening of the coupler portion 120 of the coupler-journal 100 until they are abutted against each other inside the coupler-journal 100, or are nearly abutted against each other inside the coupler portion 120.

Figure 4B:
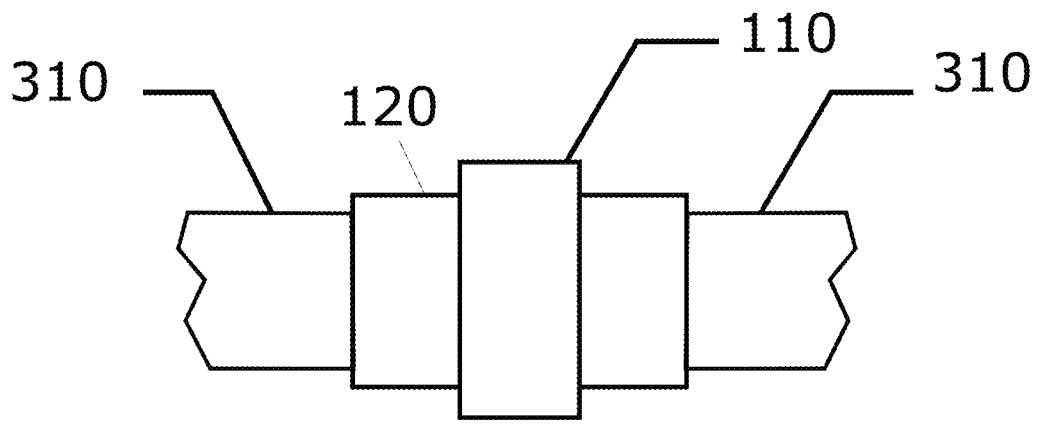
FIG. 4B shows the pair of torque tubes in FIG. 3B placed within the coupler-journal, according to some embodiments.

FIG. 4B shows the pair of torque tubes 310 in FIG. 3B placed within the coupler-journal 100, according to some embodiments. As shown, two torque tubes 310 are fully inserted into the coupler portion 120 of the coupler-journal 100 until they are abutted against each other inside the coupler-journal 100, or are nearly abutted against each other inside the coupler portion 120.

Figure 5A:
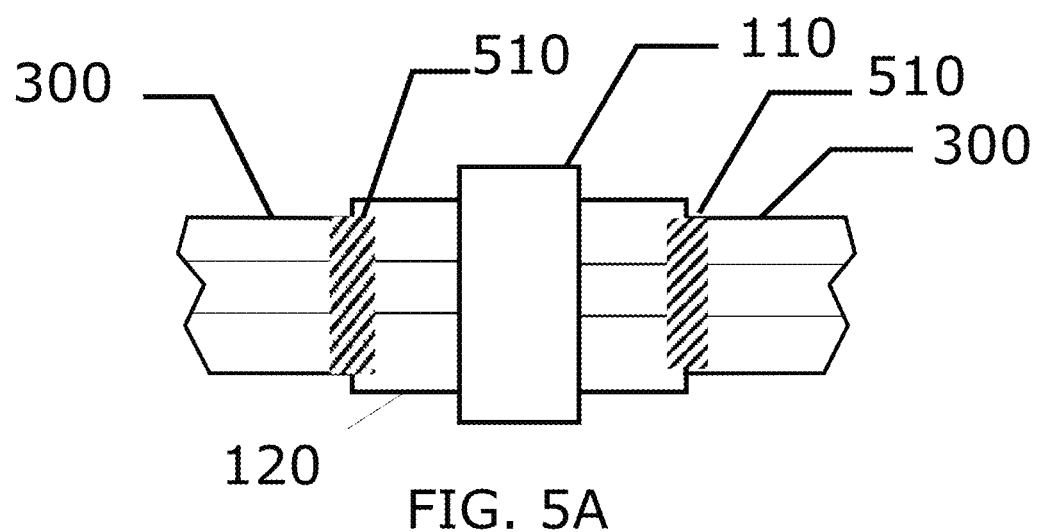
FIG. 5A shows the pair of torque tubes in FIG. 4A welded around an exposed interface perimeter with the coupler-journal of FIG. 1, according to some embodiments.

FIG. 5A shows the pair of torque tubes 300 in FIG. 4A welded around an exposed interface perimeter 510 with the coupler-journal 100 of FIG. 1, according to some embodiments. As shown, two torque tubes 300 are inserted into the coupler portion 120 of the coupler-journal 100 and welded around the exposed interface perimeter 510, or stitch-welded along the perimeter 510.

Figure 5B:
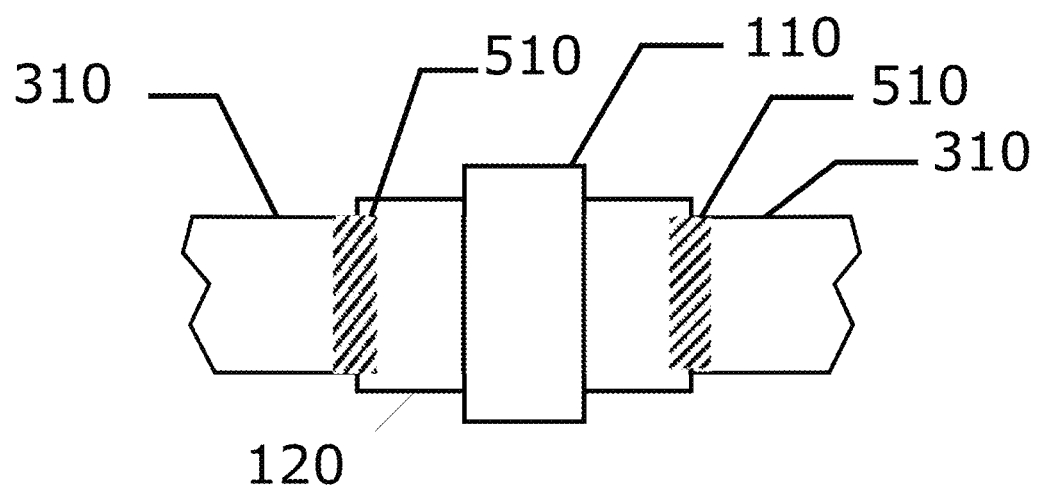
FIG. 5B shows the pair of torque tubes in FIG. 46B welded around an exposed interface perimeter with a coupler-journal, according to some embodiments.

FIG. 5B shows the pair of torque tubes 310 in FIG. 4B welded around an exposed interface perimeter 510 with a coupler-journal 100, according to some embodiments. As shown, two torque tubes 310 are inserted into the coupler portion 120 of the coupler-journal 100 and welded around the exposed interface perimeter 510, or stitch-welded along the interface perimeter 510.

In one or more embodiments, the coupler-journal 100 provides: a coupler to join two torque tubes (e.g., torque tubes 300 (FIG. 5A) or torque tubes 310 (FIG. 5B) end-to-end; a journal coincident with the coupler portion 120 that turns inside a simple bearing system and that does not require a bushing; and a journal in a simple bearing system that maintains a continuous ground path. In some embodiments, the exact same coupler portion 120 that connects two torque tubes end-to-end via field welding also performs as a journal in a simple bearing system using the bearing 210 (FIG. 2) via its smooth, cylindrical outer surface, with enough surface area to minimize pressure and wear, and with enough constant, conductive contact area to also perform as an integral ground path.

In some embodiments, the length of the torque tubes (e.g., torque tubes 300 (FIG. 5A) or torque tubes 310 (FIG. 5B)) be the same as the distance between the supporting piers 220 (or posts) (FIG. 2) such that two adjacent torque tubes abut against each other centrally over the coupler portion 120, where the coupler portion 120 also serves as a journal centered in a bearing. No intermediary bushing of plastic or metal or any other material is needed. This provides a metal journal turning inside a metal bearing to form a simple bearing. The metal-on-metal contact between the two circular surfaces, aided by the weight of the torque tubes and the weight of the solar panels 410 (FIG. 4) supported by the torque tubes, creates a constant ground path between the journal and the bearing. In some embodiments, the outer journal surface of the coupler-journal 100 is cylindrical to give maximum surface area of contact to the circular bearing surface, therefore minimizing the pressure on both interfacing surfaces of the coupler-journal 100 and the bearing. The coupler's inner surface may be faceted in the same shape and approximate dimensions of the multi-sided torque tube 300, therefore capable of maintaining a tight fit after welding the two abutted torque tubes 300 together and transferring the torque from one torque tube 300 to the adjoining torque tube 300 while keeping the abutted torque tubes 300 in axial and rotational alignment. The coupler portion 120 inner surface may be non-faceted in the same non-faceted shape and approximate dimensions of a round torque tube 310, therefore connecting the two abutted torque tubes 310 together with a field weld and transferring the torque from one torque tube 310 to the adjoining torque tube 310 while keeping the abutted torque tubes 310 in axial and rotational alignment. The thickness of the material between the outer round surface of the journal and the inner faceted or non-faceted surface of the coupler portion 120 is of sufficient thickness to transfer the calculated torque from one torque tube 300/310 to the next for the life of a tracker system while considering life time wear.

In one or more embodiments, a significant advantage of the coupler-journal 100 is that there is no need to have a separate coupler and separate journal. Another significant advantage of this coupler-journal 100 is that there is no need to add a grounding strap, or grounding wire, from the stationary pier 220 (FIG. 2) to the rotating torque tube 300

(FIG. 5A) or 310 (FIG. 5B) to ground each post 220. Another significant advantage of this coupler-journal 100 is that the mechanical parts of the single axis tracking system can be disassembled and reworked if need be by grinding away the welds. Another significant advantage of this coupler-journal 100 is that it reduces field assembly time and shortens the construction schedule because the three parts of coupler, journal, and ground strap have become one, yielding two less parts to procure, ship, receive, stage, assemble, and inspect in a multitude of devices.

In one or more embodiments, the continuous contact, pressure, and wiping back and forth between the outer round journal surface of the coupler-journal 100 and the inside surface of the bearing 210 (FIG. 2) sustains a continuous electrical ground path between the coupler-journal 100 and the bearing 210. The coupler portion 120 is hollow inside to allow one or two torque tubes 300 (FIG. 5A) or 310 (FIG. 5B) to slide inside the coupler portion 120. The wall thickness of the journal portion of the cylindrical central body 110 is thick enough to perform as a journal in a simple bearing system for the intended multi-decade life for which it is intended (e.g., performing as a journal in a simple bearing for a horizontal single axis tracker which will rotate back and forth every day for perhaps thirty years, constituting approximately twenty-two thousand turns). The wall thickness of the coupler portion 120 is sufficient enough to transfer the torque from one torque tube to the next.

In some embodiments, the outside round bearing 210 surface maximizes the surface contact to the bearing 210, therefore minimizing pressure at the simple bearing interfaces, and minimizing wear on the coupler-journal 100 and wear on the bearing 210 and performing as the journal in a simple bearing system. The three functions of coupling together two torque tubes, performing as a journal in a bearing, and providing an electrical ground path are provided for single axis tracking systems used on solar photovoltaic power plants.

One or more embodiments provide relatively low steel-on-steel friction, especially after the rubbing surfaces become shiny smooth. Movement is silent because the rotation is slow, is limited to approximately 90 degrees of rotation throughout the daylight hours, and is infrequent as it turns and stops in small increments. The metal interface is effectively wiped twice a day, keeping both surfaces of bearing and journal rust free, shiny, smooth, and electrically conductive. The large surface area of the cylindrical journal against the large cylindrical bearing surface minimizes the interface pressure and therefore minimizes the wear.

Conventional systems use a coupler separate from the bearing to connect two torque tubes end-to-end. These separate couplers are affixed to the torque tubes with bolt and nut hardware as well as with field welding. These systems thus have two discreet parts of a bearing and coupler. Other conventional systems involve factory welded flanges with bolt hole patterns attached to the ends of the torque tubes to allow the torque tubes to be bolted together end-to-end in the field. These flanges perform as the coupling system and must occur a distance away from the pier (or post) and bearing. Note that square torque tubes used as couplers have been used as the journal inside a round simple bearing. The two relatively small surface areas of the two bottom corners of the square torque tube suffer from excessive wear caused by their excessive surface pressure during rotation. The primary reason for plastic bushings is to distribute the weight, and hence pressure, away from the small area of the two corners of a square torque tube to the much broader area of the round surface area typical in a round bearing system. One disadvantage of the plastic bushing is that they can break, especially if deployed improperly. Plastic can make a strong and durable wear surface but does not work well as a structural element used as a moving part that must withstand cyclic stress, such as would be the case of a rotating plastic bushing in a simple bearing system on a single axis tracker that must withstand an approximate 22,000 cycles of cyclic stress resulting from the shifting weight of the tracking solar panels, from various wind events, and from decades of thermal expansion and contraction of the long torque tube axle.

Some embodiments include a method or process including placing a first torque tube (e.g., a torque tube 300, FIGS. 3A, 4A, and 5A, or torque tube 310, FIGS. 3B, 4B, and 5B) into a first opening of a coupling portion (e.g., coupling portion 120, FIGS. 1-5B) of a coupler-journal (e.g., coupler-journal 100, FIGS. 1-5B). The method further includes placing a second torque tube (e.g., a torque tube 300, FIGS. 3A, 4A, and 5A, or torque tube 310, FIGS. 3B, 4B, and 5B) into a second opening of a coupling portion of the coupler-journal. The method still further includes connecting a bearing (e.g., bearing 210, FIG. 2) around a central body portion (e.g., central body 110) of the coupler-journal. The method also includes attaching a plurality of solar panels (e.g., solar panels 410, FIG. 4) to the panel mounting rail.

In one or more embodiments, the method further includes welding the first torque tube to a first interface perimeter (e.g., a first interface perimeter 510, FIGS. 5A-B) of the coupling portion, and welding the second torque tube to a second interface perimeter (e.g., a second interface perimeter 510, FIGS. 5A-B) of the coupling portion.

In one or more embodiments, the method further includes attaching a pier insert portion (e.g., pier coupler 215 portion, FIG. 2) of the bearing to a pier (e.g., pier or post 220, FIG. 2), and rotating the first torque tube and the second torque tube simultaneously with a solar tracker system (e.g., a conventional solar tracker system that rotates the torque tubes clockwise and counter-clockwise for tracking the sun for maximizing solar energy collection for the solar panels during daylight).

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of pre-AIA 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A system comprising:
   a first torque tube;
   a second torque tube, wherein the first torque tube and the second torque tube each having a same inner diameter and a same outer diameter from end to end;
   a coupler-journal including a central body portion and a coupling portion, wherein the central body portion has a greater diameter than the coupling portion; and
   a bearing configured for placement around the central body portion;
   wherein the coupler-journal being configured for receiving a first torque tube within a first opening of the coupling portion and receiving a second torque tube within a second opening of the coupling portion.

2. The system of claim 1, wherein the central body portion comprises:
   a cylindrical exterior surface; and
   an interior surface shaped congruently with a shape of an exterior of the first torque tube and the second torque tube.

3. The system of claim 1, wherein the first torque tube and the second torque tube are coupled to the journal-coupler via insertion of a first end portion of the first torque tube into the first opening and insertion of a first end portion of the second torque tube into the second opening.

4. The system of claim 3, wherein the first torque tube is configured to have a first portion coupled to the first opening, and the second torque tube is configured to have a second portion coupled to the second opening.

5. The system of claim 4, wherein the first torque tube is welded to a first interface perimeter of the coupling portion, and the second torque tube is welded to a second interface perimeter of the coupling portion.

6. The system of claim 1, wherein the bearing comprises a pier insert portion including first and second vertical slot fastening openings.

7. The system of claim 6, wherein the pier insert portion is configured for:
   coupling with a pier that includes a plurality of horizontal slot openings for adjustably aligning the pier insert portion with the pier; and
   fastening with the first and second vertical slot fastening openings of the pier insert portion via a plurality of fasteners.

8. The system of claim 1, wherein the first torque tube and the second torque tube have one of a rounded shape or a multi-faceted shape, and the first torque tube and the second torque tube rotate with the coupler-journal within the bearing.

9. A method comprising:
   providing a journal-coupler having a coupling portion with a first opening and a second opening;
   placing a first torque tube into the first opening of the coupling portion of the coupler-journal;
   placing a second torque tube into the second opening of the coupling portion of the coupler-journal, wherein the first torque tube and the second torque tube each having a same inner diameter and a same outer diameter from end to end;
   connecting a bearing around a central body portion of the coupler-journal; and
   coupling a plurality of solar panels with the first torque tube and the second torque tube;
   wherein the central body portion has a greater diameter than the coupling portion.

10. The method of claim 9, further comprising:
    welding the first torque tube to a first interface perimeter of the coupling portion; and
    welding the second torque tube to a second interface perimeter of the coupling portion.

11. The method of claim 10, further comprising attaching a pier insert portion of the bearing to a pier having a plurality of horizontal slots, the pier insert portion including first and second vertical slots for adjustably aligning the pier insert portion with the pier.

12. The method of claim 10, further comprising rotating the first torque tube and the second torque tube simultaneously with a solar tracker system, wherein the first torque tube and the second torque tube rotate with the coupler-journal within the bearing.

* * * * *